United States Patent [19]
Sasaki et al.

[11] Patent Number: 5,976,482
[45] Date of Patent: Nov. 2, 1999

[54] PROCESS FOR PRODUCTION OF PRUSSIC ACID

[75] Inventors: Yutaka Sasaki; Hiroshi Utsumi; Kazuo Morishita; Kenichi Miyaki, all of Yokohama, Japan

[73] Assignee: Mitsubishi Rayon Co., Ltd., Tokyo, Japan

[21] Appl. No.: 09/038,947

[22] Filed: Mar. 12, 1998

[51] Int. Cl.[6] ............................. C01C 3/02; B01J 27/198
[52] U.S. Cl. ............................................ 423/376; 502/209
[58] Field of Search ............................. 502/209; 423/376

[56] References Cited

U.S. PATENT DOCUMENTS

| | | |
|---|---|---|
| 3,911,089 | 10/1975 | Shiraishi et al. . |
| 4,457,905 | 7/1984 | Ebner . |
| 4,461,752 | 7/1984 | Sasaki et al. . |
| 4,511,548 | 4/1985 | Attig et al. . |
| 4,946,819 | 8/1990 | Sasaki et al. . |
| 4,981,830 | 1/1991 | Sasaki et al. . |
| 5,094,990 | 3/1992 | Sasaki et al. . |
| 5,158,787 | 10/1992 | Sasaki et al. . |

FOREIGN PATENT DOCUMENTS

| | | |
|---|---|---|
| 0 340 909 | 11/1989 | European Pat. Off. . |
| 0 404 529 A1 | 12/1990 | European Pat. Off. . |
| 0 641 771 A1 | 3/1995 | European Pat. Off. . |
| 0 750 942 A2 | 1/1997 | European Pat. Off. . |
| 51-10200 | 1/1976 | Japan . |
| 106226 | of 0000 | U.S.S.R. . |

*Primary Examiner*—Wayne Langel
*Attorney, Agent, or Firm*—Pillsbury Madison & Sutro LLP

[57] ABSTRACT

A process for producing prussic acid by subjecting methanol to a gas-phase contact reaction with molecular oxygen and ammonia in the presence of a catalyst, wherein said catalyst is an oxide composition containing iron, antimony, phosphorus and vanadium with a content of vanadium content being at least 0.6 in terms of atomic ratio relative to iron content taken as 10, and a mixed raw material gas for the gas-phase contact reaction contains oxygen at an oxygen-to-methanol molar ratio of less than 1.6.

3 Claims, No Drawings

PROCESS FOR PRODUCTION OF PRUSSIC ACID

BACKGROUND OF THE INVENTION

1. Field of the Invention

The present invention relates to a process for producing prussic acid. More particularly, the present invention relates to a process for producing prussic acid by subjecting methanol to ammoxidation in a gas-phase contact reaction.

2. Description of the Related Art

Prussic acid is produced by decomposition of formamide, reaction of methane with ammonia, ammoxidation of methane, etc. A large portion of the prussic acid consumed is a by-product formed when propylene is subjected to ammoxidation to produce acrylonitrile.

Prussic acid has been increasingly used as raw material for acetone cyanohydrin, adiponitrile, chelating agent such as EDTA and the like, and also used for gold recovery. The gap between its supply and demand has been becoming more obvious.

In view of the above situation, the present invention have been completed in order to develop a novel process for producing prussic acid by ammoxidation of methanol, which has excellent industrial applicability.

For production of prussic acid by ammoxidation of methanol, various catalysts are known such as molybdenum oxide, described in U.R.S.S. Patent No. 106226; an oxide containing molybdenum, bismuth and other elements, described in U.S. Pat. No. 3,911,089; an oxide containing antimony and at least one element selected from the group consisting of iron, cobalt, nickel, manganese, zinc and uranium, described in JP-A-51-10200; an oxide catalyst containing manganese and phosphorus, described in U.S. Pat. No. 4,457,905; an antimony phosphate, described in U.S. Pat. No. 4,511,548; and so forth.

In order to improve the iron and antimony-based oxide catalyst described in JP-A-51-10200, the present inventors proposed an oxide catalyst containing iron, copper and antimony, in U.S. Pat. No. 4,461,752; an oxide catalyst containing iron, copper, antimony and phosphorus, in U.S. Pat. No. 5,158,787; and a catalyst containing iron, antimony and phosphorus as essential components and iron antimonate as a crystal phase, in U.S. Pat. No. 5,094,990. The present inventors further proposed improved processes for catalyst production, in U.S. Pat. No. 4,946,819, U.S. Pat. No. 4,981,830, etc. Theses processes showed progresses in various respects, but still had points to be improved for industrial application.

That is, in producing prussic acid by ammoxidation of methanol, the above-mentioned catalysts require a high oxygen-to-methanol ratio in a mixed raw material gas in order to avoid a reduction in prussic acid yield or a reduction in catalytic activity with time. Consequently, when prussic acid is produced industrially with the catalysts, the reaction must be conducted at a low methanol concentration, which results in a lower productivity.

The present invention has been completed in order to (1) alleviate the above-mentioned problems of the prior art and (2) provide an economical process for producing prussic acid, which uses a catalyst having significantly improved redox stability, which enables an efficient reaction at a low oxygen-to-methanol ratio of mixed raw material gas, and which gives prussic acid as intended product at a high yield, at a high selectivity and stably with the lapse of reaction time.

SUMMARY OF THE INVENTION

In order to achieve the above object, the present inventors made an extensive study on the improvement of the oxide catalyst containing iron, copper, antimony and phosphorus, described in U.S. Pat. No. 5,158,787 and the catalyst containing iron, antimony and phosphorus as essential components and iron antimonate as a crystal phase, described in U.S. Pat. No. 5,094,990. As a result, the present inventors found out that an oxide catalyst obtained from a combination of iron, antimony, phosphorus and vanadium can well utilize oxygen in a catalytic reaction of methanol, oxygen and ammonia for production of prussic acid and can prevent a reduction in prussic acid yield even at a low oxygen-to-methanol molar ratio and that the catalyst, when the content of vanadium component therein is at a certain level or higher, can have a significantly improved redox stability and has very high resistance to deterioration. The present invention has been completed based on the above finding.

The present invention relates to a process for producing prussic acid by subjecting methanol to a gas-phase contact reaction with molecular oxygen and ammonia in the presence of a catalyst, wherein the catalyst used is an oxide composition containing iron, antimony, phosphorus and vanadium with the content of vanadium being 0.6 in terms of atomic ratio relative to the iron content taken as 10, and the mixed raw material gas fed into the reaction system contains oxygen at an oxygen-to-methanol molar ratio of less than 1.6.

PREFERRED EMBODIMENTS OF THE INVENTION

Catalyst

The catalyst used in the present process contains, as essential components, not only iron, antimony and phosphorus but also a particular amount of vanadium, and thereby has improved activity and other properties and can give a high prussic acid productivity. The content of vanadium in the catalyst is at least 0.6, preferably 0.6–3 in terms of atomic ratio to the iron content taken as 10.

The present catalyst, when specifically shown, is an oxide composition represented by the following empirical formula:

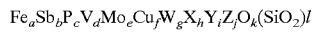

$$Fe_aSb_bP_cV_dMo_eCu_fW_gX_hY_iZ_jO_k(SiO_2)_l$$

wherein X is at least one element selected from the group consisting of Mg, Zn, La, Ce, Al, Cr, Mn, Co, Ni, Bi, U and Sn (preferably at least one element selected from the group consisting of Zn, Al, Mn, Co and Ni); Y is at least one element selected from the group consisting of B and Te; Z is at least one element selected from the group consisting of Li, Na, K, Rb, Cs, Ca and Ba; and a, b, c, d, e, f, g, h, i j, k and l are atomic ratios, and when a is 10, b=12–30 (preferably 15–27), c=1–30 (preferably 3–20, more preferably 5–15, and b/c>1.5), d=0.6–3 (preferably 0.8–2.8, more preferably 1–2.5), e=0–0.3, f=0–5, preferably 0.5–4, g=0–3, h=0–6, i=0–5, j=0–3, k=a number corresponding to the oxides formed by the elements Fe, Sb, P, V, Mo, Cu, W, X, Y and Z, and l=0–200.

In the present catalyst containing iron, antimony, phosphorus and vanadium as essential components, it is not clear what compound these components form in the catalyst to exhibit improved activity and other properties. It is presumed, however, that the components are closely related to each other to exhibit improved activity and other properties, in view of the fact that, when the composition of the catalyst deviates from the range of the above empirical formula, the selectivity of prussic acid formation decreases or the properties of the catalyst are deteriorated, making it difficult to achieve the intended object of the present invention. It is preferred that iron antimonate is contained as a crystal phase in the catalyst. The vanadium component is presumed to form a solid solution with iron antimonate. The presence of iron antimonate is effective for the improvement of prussic acid yield, the prevention of reduction in yield during long-term operation, and the optimization of catalyst properties.

It is already known in the ammoxidation of propylene that the addition of a vanadium, molybdenum or tungsten component to an iron and antimony-containing catalyst is effective for increased reaction rate and increased resistance to reductive deterioration. In an iron, antimony and phosphorus-containing catalyst, addition of, in particular, a vanadium component has shown an excellent effect and addition of a particular amount of the vanadium component has shown remarkable effects that prussic acid can be stably obtained at a high yield and a high selectivity with the long lapse of reaction time even when the oxygen-to-methanol ratio in the mixed raw material gas fed into the reaction system is low, that is, the concentration of methanol is high. Neither molybdenum component nor tungsten component shows such effects. The above fact is unpredictable from the past knowledge.

Addition of a copper component and an X component is effective for (1) prevention of the formation of protruding substance, crystalline antimony oxide on catalyst surface which is liable to occur when the antimony content in catalyst is high, (2) increased catalyst strength and (3) control of reaction rate and catalyst physical properties. Addition of a Y component contributes to improved selectivity. Addition of a Z component contributes to control of reaction rate and by-product formation.

The present catalyst can be used per se without using any carrier, but is preferably used by supporting it on a carrier. The amount of the carrier can be varied as desired within a range of 10–90% by weight of the total catalyst weight. The preferred carrier is silica, although there can be used alumina, silica-alumina, titania, zirconia and the like.

Production of Catalyst

The present catalyst can be produced by any known method. There can be used any of the methods described in, for example, U.S. Pat. No. 4,946,819, U.S. Pat. No. 4,981,830 and U.S. Pat. No. 5,094,990. (Raw materials for catalyst)

The starting material for each component constituting the present catalyst can be selected from the metal, oxide, hydroxide, chloride, nitrate, etc. of each component. The starting material also includes such materials as each can become an oxide of each component when subjected to a chemical treatment, a calcining treatment or the like.

As the raw material for the iron component, there can be used iron oxides such as ferrous oxide, ferric oxide, tri-iron tetroxide and the like; mineral acid salts of iron such as ferrous chloride, ferric chloride, ferric nitrate, iron carbonate and the like; product of iron oxidation with nitric acid; organic acid salts of iron such as iron oxalate, iron citrate and the like; and so forth.

As the raw material for the antimony component, there can be used antimony trioxide, antimony tetroxide, antimony pentoxide, antimonic acid, polyantimonic acid(s), sodium antimonate, potassium antimonate, antimony trichloride, antimony pentachloride, etc. A product of metal antimony oxidation with nitric acid can also be used.

As the raw material for the phosphorus component, there can be used phosphorus pentoxide, orthophosphoric acid, ammonium dihydrogenphosphate, ammonium hydrogenphosphate, ammonium phosphate, etc.

As the raw material for the vanadium component, there can be used vanadium pentoxide, ammonium metavanadate, vanadyl oxalate, vanadyl sulfate, etc.

As the raw material for the copper component, there can be used cuprous oxide, cupric oxide, copper nitrate, etc.

As the raw material for the molybdenum component, there can be used molybdenum trioxide, molybdic acid, ammonium paramolybdate, ammonium metamolybdate, molybdenum halides, etc. As the raw material for the tungsten component, there can be used tungsten trioxide, ammonium paratungstate, ammonium metatungstate, tungstic acid, etc.

As the raw materials for the X, Y and Z components, there can be used oxides, hydroxides, nitrates, carbonates, organic acid salts, etc. of respective components.

As the raw material for the silica carrier, silica sol can be used preferably. Part or the whole thereof may be silica hydrogel, fumed silica or the like.

(Preparation of catalyst)

In the present invention, the catalyst can be used in a fixed bed or in a fluidized bed.

When a fixed-bed catalyst is produced, raw material powders are subjected to pressure molding or a slurry of raw materials is dried, and the resulting material is subjected to molding and calcining. When a fluidized-bed catalyst is produced, a slurry of raw materials is, if necessary, subjected to pH adjustment (to about 7 or less, preferably about 1–4) and heat treatment at about 40–150° C.; the resulting slurry is subjected to spray drying; and the resulting fine spherical particles are calcined.

The above calcination is important to allow the obtained catalyst to have desired activity and selectivity. The preferable conditions for the calcination are 200–800° C., preferably 400–750° C. and 0.5–10 hours. The atmosphere used in the calcination is not particularly restricted and may be any of an non-reductive gas. The atmosphere is ordinarily air from an economical reason. In the calcination can be used a tunnel kiln, a rotary kiln, a fluidized-bed calciner, or the like.

The shape and size of the catalyst can be determined depending upon the application purpose. When used in a fixed bed, the catalyst ordinarily has a cylindrical or spherical shape of several millimeters; when used in a fluidized bed, the catalyst ordinarily takes a particulate shape of 10–200 μm.

Reaction

The present catalyst can be favorably used in production of prussic acid by ammoxidation of methanol. This reaction can be carried out by any of a fixed-bed reaction and a fluidized-bed reaction, but is preferably conducted by the latter reaction.

The reaction is conducted by contacting a mixed gas containing methanol, molecular oxygen and ammonia, with the present catalyst. The reaction can be conducted stably at a low oxygen-to-methanol ratio and at a low ammonia-to-methanol ratio, because the catalyst shows a high selectivity of prussic acid formation, gives a sufficiently high reaction rate and has high redox stability. The methanol concentration in the feed gas can be varied in a range of 3–20%. The molar ratio of oxygen to methanol in the feed gas is less than 1.6, preferably 0.8–1.5; and the molar ratio of ammonia to methanol in the feed gas is 1.2 or less, preferably 0.7–1.1.

The reaction temperature is 350–500° C., preferably 380–470° C.

The reaction pressure may be any of ordinary pressure, an applied pressure and a reduced pressure, but is appropriately in the range of about ordinary pressure to 2 kg/cm$^2$G.

The contact time is 0.01–20 seconds, preferably 0.05–10 seconds, particularly preferably 0.1–6 seconds, based on the gas volume at the reaction temperature and the reaction pressure.

In the ammoxidation of methanol according to the present process, propylene, isobutene, tertiary butanol or the like may be fed into the reaction system together with the feed gas, whereby acrylonitrile (in the case of propylene) or methacrylonitrile (in the case of isobutene or tertiary butanol) can be produced together with prussic acid.

The embodiments and effects of the present invention are specifically described below by way of Examples. However, the present invention is not restricted to these Examples alone.

Test Method for Catalytic Activity

Each catalyst was filled in a fluidized-bed reactor having an inner diameter (of catalyst-fluidizing portion) of 25 mm and a height of 400 mm. Into the reactor was fed a mixed gas consisting of methanol, ammonia and air. The composition of the mixed gas fed is shown in Examples. The reaction pressure employed was atmospheric pressure.

Incidentally, "contact time" had the following definition.

Apparent contact time (sec)=[catalyst volume (*l*) based on apparent bulk density]/[volume of fed gas (*l*/sec) expressed as that under reaction conditions]

Prussic acid yield and methanol conversion had the following definitions.

= [carbon weight of prussic acid formed] ÷
[carbon weight of methanol fed] × 100
Methanol conversion (%)
= [carbon weight of methanol reacted] ÷ [carbon weight of methanol fed] × 100

Catalysts Used for Reaction and Preparation Thereof

[Catalyst 1]

A catalyst having the following empirical formula:

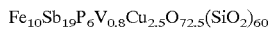

$Fe_{10}Sb_{19}P_6V_{0.8}Cu_{2.5}O_{72.5}(SiO_2)_{60}$ was prepared as follows.

247.3 g of an antimony trioxide powder (a) was taken.

385 ml of nitric acid (specific gravity: 1.38) was mixed with 480 ml of water and the mixture was heated. Thereto was added 49.9 g of an electrolytic iron powder in small portions to obtain a solution. In this solution was dissolved 54.0 g of copper nitrate to obtain a solution (b).

8.4 g of ammonium metavanadate was dissolved in 300 ml of water to obtain a solution (c).

1,612 g of silica sol (SiO$_2$: 20% by weight) (d) was taken.

To (b) were added (d), (a) and (c) in this order, with sufficient stirring. The resulting slurry was adjusted to pH 2 with 15% ammonia water and then subjected to a heat treatment at 98° C. for 3 hours, with stirring. Then, 61.8 g of phosphoric acid (85%) was added to the heat-treated slurry, followed by sufficient stirring. Then, the slurry was subjected to spray drying by the use of a rotary disc type spray dryer. The resulting fine spherical particles were calcined at 200° C. for 2 hours, further at 500° C. for 3 hours, furthermore at 800° C. for 3 hours.

[Catalyst 2]

A catalyst represented by the following empirical formula:

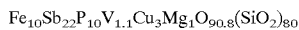

$Fe_{10}Sb_{22}P_{10}V_{1.1}Cu_3Mg_1O_{90.8}(SiO_2)_{80}$ was produced in the same manner as in the case of catalyst 1 except that magnesium nitrate was used as a raw material for the Mg component and an aqueous solution thereof was added after the antimony trioxide powder (a).

[Catalyst 3]

A catalyst represented by the following empirical formula:

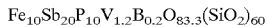

$Fe_{10}Sb_{20}P_{10}V_{1.2}B_{0.2}O_{83.3}(SiO_2)_{60}$ was produced in the same manner as in the case of catalyst 1 except that boric acid anhydride was used as a raw material for the B component and an aqueous solution thereof was added after the antimony trioxide powder (a).

[Catalyst 4]

A catalyst represented by the following empirical formula:

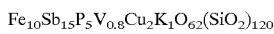

$Fe_{10}Sb_{15}P_5V_{0.8}Cu_2K_1O_{62}(SiO_2)_{120}$ was produced in the same manner as in the case of catalyst 1 except that potassium nitrate was used as a raw material for the K component and an aqueous solution thereof was added after the antimony trioxide powder (a).

[Catalyst 5]

A catalyst represented by the following empirical formula:

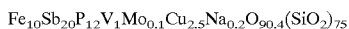

$Fe_{10}Sb_{20}P_{12}V_1Mo_{0.1}Cu_{2.5}Na_{0.2}O_{90.4}(SiO_2)_{75}$ was produced in the same manner as in the case of catalyst 1 except that ammonium paramolybdate was used as a raw material for the Mo component, sodium nitrate was used as a raw material for the Na component, and aqueous solutions thereof were added after the antimony trioxide powder (a).

[Catalyst 6]

A catalyst represented by the following empirical formula:

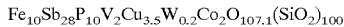

$Fe_{10}Sb_{28}P_{10}V_2Cu_{3.5}W_{0.2}Co_2O_{107.1}(SiO_2)_{100}$ was produced in the same manner as in the case of catalyst 1 except that ammonium paratungstate was used as a raw material for the W component, cobalt nitrate was used as a raw material for the Co component, and aqueous solutions thereof were added after the antimony trioxide powder (a).

[Catalyst 7]

A catalyst represented by the following empirical formula:

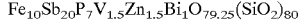

$Fe_{10}Sb_{20}P_7V_{1.5}Zn_{1.5}Bi_1O_{79.25}(SiO_2)_{80}$ was produced in the same manner as in the case of catalyst 1 except that bismuth nitrate was used as a raw material for the Bi component and an aqueous suspension thereof was added after the antimony trioxide powder

[Catalyst 8]

A catalyst represented by the following empirical formula:

$Fe_{10}Sb_{25}P_{14}V_{2.5}Mn_{2.5}Al_{1.5}Te_{0.2}O_{113.9}(SiO_2)_{100}$ was produced in the same manner as in the case of catalyst 1 except that telluric acid was used as a raw material for the Te component and an aqueous solution thereof was added after the antimony trioxide powder (a).

[Catalyst 9]

A catalyst represented by the following empirical formula:

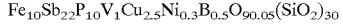

$Fe_{10}Sb_{22}P_{10}V_1Cu_{2.5}Ni_{0.3}B_{0.5}O_{90.05}(SiO_2)_{30}$ was produced in the same manner as in the case of catalyst 1 except that nickel nitrate was used as a raw material for the Ni component, boric acid anhydride was used as a raw material for the B component, and aqueous solutions thereof were added after the antimony trioxide powder (a).

[Catalyst 10]

A catalyst represented by the following empirical formula:

$$Fe_{10}Sb_{17}P_8V_{1.2}Mo_{0.1}Cu_{0.5}Zn_{0.5}Ba_{0.3}O_{73.6}(SiO_2)_{60}$$

was produced in the same manner as in the case of catalyst 1 except that ammonium paramolybdate was used as a raw material for the Mo component, zinc nitrate was used as a raw material for the Zn component, barium nitrate was used as a raw material for the Ba component, and aqueous solutions thereof were added after the antimony trioxide powder (a).

[Catalyst 11]

A catalyst represented by the following empirical formula:

$$Fe_{10}Sb_{26}P_{20}V_{1.7}Cu_3O_{124.25}(SiO_2)_{80}$$

was produced in the same manner as in the case of catalyst 1.

[Comparative catalyst 1]

A catalyst represented by the following empirical formula:

$$Fe_{10}Sb_{19}P_6Mo_{0.8}Cu_{2.5}O_{72.9}(SiO_2)_{60}$$

was produced in the same manner as in the case of catalyst 1 except that ammonium paramolybdate was used in place of ammonium metavanadate. [Comparative catalyst 2]

A catalyst represented by the following empirical formula:

$$Fe_{10}Sb_{22}P_{10}V_{0.4}Cu_3Mg_1O_{89.0}(SiO_2)_{80}$$

was produced in the same manner as in the case of catalyst 2.

[Comparative Catalyst 3]

A catalyst represented by the following empirical formula:

$$Fe_{10}Sb_{20}P_{12}V_5Mo_{0.1}Cu_{2.5}Na_{0.2}O_{100.4}(SiO_2)_{75}$$

was produced in the same manner as in the case of catalyst 5.

[Comparative Catalyst 4]

A catalyst represented by the following empirical formula:

$$Fe_{10}Sb_{20}V_{1.7}Mo_{0.1}Cu_{2.5}Na_{0.2}O_{60.4}(SiO_2)_{75}$$

was produced in the same manner as in the case of catalyst 5 except that no phosphoric acid was added.

[Comparative Catalyst 5]

A catalyst represented by the following empirical formula:

$$Fe_{10}Sb_{20}P_{12}V_1Mo_{0.5}Cu_{2.5}Na_{0.2}O_{91.6}(SiO_2)_{75}$$

was produced in the same manner as in the case of catalyst 5.

EXAMPLES 1–3 AND COMPARATIVE EXAMPLES 1–3

Each of the catalyst 1 and the comparative catalyst 1 was measured for catalytic activity under the conditions of reaction temperature=440° C. and contact time=0.5 sec. The results are shown in Table 1.

TABLE 1

| | Catalyst (calcining temp. °C.) | Molar ratio to methanol | | Methanol Conversion (%) | Prussic acid Yield (%) |
|---|---|---|---|---|---|
| | | Oxygen | Ammonia | | |
| Example 1 | Catalyst 1 (800) | 1.5 | 1.1 | 100 | 94.5 |
| Example 2 | Catalyst 1 (800) | 1.3 | 1.1 | 99.8 | 91.9 |
| Example 3 | Catalyst 1 (800) | 1.3 | 1.0 | 99.4 | 91.0 |
| Comparative Example 1 | Comparative catalyst 1 (800) | 1.5 | 1.1 | 100 | 90.1 |
| Comparative Example 2 | Comparative catalyst 1 (800) | 1.3 | 1.1 | 100 | 80.3 |
| Comparative Example 3 | Comparative catalyst 1 (800) | 1.3 | 1.0 | 98.6 | 78.1 |

EXAMPLES 4–13 AND COMPARATIVE EXAMPLES 4–7

Each of the catalysts 2–11 and the comparative catalysts 2–5 was measured for catalytic activity at an oxygen-to-methanol molar ratio of 1.3 and an ammonia-to-methanol molar ratio of 1.0. The results are shown in Table 2.

TABLE 2

| Catalyst (calcining temp. °C.) | Reaction temp. (°C.) | Contact time (sec) | Methanol conversion (%) | Prussic acid Yield (%) |
|---|---|---|---|---|
| Example 4 | Catalyst 2 (820) | 430 | 0.8 | 100 | 91.6 |
| Example 5 | Catalyst 3 (800) | 440 | 1.0 | 98.4 | 91.7 |
| Example 6 | Catalyst 4 (850) | 430 | 0.5 | 99.1 | 90.9 |
| Example 7 | Catalyst 5 (800) | 450 | 0.5 | 99.5 | 92.6 |
| Example 8 | Catalyst 6 (770) | 440 | 1.0 | 100 | 91.7 |
| Example 9 | Catalyst 7 (880) | 430 | 0.5 | 99.0 | 92.3 |
| Example 10 | Catalyst 8 (750) | 440 | 0.5 | 100 | 91.6 |
| Example 11 | Catalyst 9 (770) | 430 | 0.8 | 99.6 | 91.5 |
| Example 12 | Catalyst 10 (820) | 420 | 9.3 | 100 | 92.0 |
| Example 13 | Catalyst 11 (770) | 440 | 1.0 | 98.1 | 90.1 |
| Comparative Example 4 | Comparative catalyst 2 (820) | 430 | 0.8 | 98.6 | 88.8 |
| Comparative Example 5 | Comparative catalyst 3 (800) | 450 | 0.5 | 100 | 88.2 |
| Compatative Example 6 | Comparative catalyst 4 (800) | 450 | 0.5 | 100 | 85.4 |
| Comparative Example 7 | Comparative catalyst 5 (800) | 450 | 0.5 | 100 | 89.0 |

EXAMPLE 14 AND COMPARATIVE EXAMPLE 8

Each of the catalyst 2 and the comparative catalyst 2 was measured for long-term catalytic activity at an oxygen-to-methanol molar ratio of 1.2 and an ammonia-to-methanol molar ratio of 1.0. The results are shown in Table 3.

TABLE 3

| | Reaction temp. (°C.) | Contact time (sec.) | Elapse of reaction time (hr) | Methanol conversion (%) | Prussic acid yield (%) |
|---|---|---|---|---|---|
| Example 14 | 430 | 0.8 | 2 | 100 | 91.6 |
| | 430 | 0.8 | 500 | 100 | 91.2 |
| Comparative Example 8 | 430 | 0.8 | 2 | 98.6 | 88.8 |
| | 430 | 0.8 | 500 | 97.5 | 85.4 |

What is claimed is:

1. A process for producing prussic acid by subjecting methanol to a gas-phase contact reaction with molecular oxygen and ammonia in the presence of a catalyst, wherein said catalyst is an oxide composition containing iron, antimony, phosphorus and vanadium with a vanadium content being at least 0.6 in terms of atomic ratio relative to iron content taken as 10, and a mixed raw material gas for the gas-phase contact reaction contains oxygen at an oxygen-to-methanol molar ratio of less than 1.6.

2. A process according to claim 1, wherein the catalyst is represented by the following empirical formula:

$$Fe_a Sb_b P_c V_d Mo_e Cu_f W_g X_h Y_i Z_j O_k (SiO_2)_l$$

wherein X is at least one element selected from the group consisting of Mg, Zn, La, Ce, Al, Cr, Mn, Co, Ni, Bi, U and Sn; Y is at least one element selected from the group consisting of B and Te; Z is at least one element selected from the group consisting of Li, Na, K, Rb, Cs, Ca and Ba; and a, b, c, d, e, f, g, h, i j, k and l are atomic ratios, and when a is 10, b=12–30, c=1–30, d=0.6–3, e=0–0.3, f=0–5, g=0–3, h=0–6, i=0–5, j=0–3, k=a number corresponding to oxides formed by elements Fe, Sb, P, V, Mo, Cu, W, X, Y and Z, and l=0–200.

3. A process according to claim 1 or 2, wherein the catalyst contains iron antimonate as a crystal phase.

* * * * *

UNITED STATES PATENT AND TRADEMARK OFFICE
CERTIFICATE OF CORRECTION

PATENT NO.     : 5,976,482
DATED          : November 2, 1999
INVENTOR(S)    : Yutaka SASAKI; Hiroshi UTSUMI; Kazuo MORISHITA; Kenichi MIYAKI It is certified that error appears in the above-identified patent and that said Letters Patent is hereby corrected as shown below:

Title page:     , please add:

--[30]  Foreign Application Priority Data

Mar. 13, 1997  [JP]  Japan........9-076651--.

Signed and Sealed this

Third Day of April, 2001

Attest:

NICHOLAS P. GODICI

*Attesting Officer*        *Acting Director of the United States Patent and Trademark Office*